United States Patent
Choi et al.

(10) Patent No.: US 10,697,945 B2
(45) Date of Patent: Jun. 30, 2020

(54) METHOD OF ANALYZING COMPOUND INCLUDING AMINE GROUP BY USING BOC COMPOUND

(71) Applicant: KOREA INSTITUTE OF SCIENCE AND TECHNOLOGY, Seoul (KR)

(72) Inventors: Yongsoo Choi, Gangneung-si (KR); Jeongsook Shin, Gangneung-si (KR); Cheol-Ho Pan, Gangneung-si (KR); Sang Min Kim, Seoul (KR); Jung-Seok Yang, Seoul (KR); Kyungsu Kang, Gangneung-si (KR); Sang Hoon Jung, Gangneung-si (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 342 days.

(21) Appl. No.: 15/685,510

(22) Filed: Aug. 24, 2017

(65) Prior Publication Data
US 2018/0059075 A1 Mar. 1, 2018

(30) Foreign Application Priority Data

Aug. 24, 2016 (KR) .................. 10-2016-0107775
Aug. 23, 2017 (KR) .................. 10-2017-0106651

(51) Int. Cl.
*G01N 30/72* (2006.01)
*G01N 30/06* (2006.01)
*G01N 30/02* (2006.01)
*G01N 30/88* (2006.01)

(52) U.S. Cl.
CPC ......... *G01N 30/7233* (2013.01); *G01N 30/06* (2013.01); *G01N 2030/027* (2013.01); *G01N 2030/067* (2013.01); *G01N 2030/8818* (2013.01)

(58) Field of Classification Search
CPC ..................... G01N 30/72; G01N 30/06
USPC ................................ 436/86, 90, 173
See application file for complete search history.

(56) References Cited

U.S. PATENT DOCUMENTS

2012/0258886 A1* 10/2012 Marto ............... C07D 207/40
506/15

OTHER PUBLICATIONS

Brückner, H. et al, Chromatographia 1984, 19, 188-199.*
Hashimoto, A. et al, Journal of Chromatography 1992, 582, 41-48.*
Tesarova, E. et al, Journal of Chromatography A 1999, 818, 121-129.*
Tesarova, E. et al, Journal of Chromatography A 2000, 879, 147-156.*
Helleberg, Rapid Commuications in Mass Spectrometry 2000, 14, 1644-1653.*
Yao, Z.-P. et al, Analytical Chemistry 2000, 72, 5394-5401.*
Darnbrough, S. et al, Synthetic Communications 2001, 31, 3273-3280.*
Ouchi, H. et al, Organic Letters 2002, 4, 585-587.*

(Continued)

*Primary Examiner* — Arlen Soderquist
(74) *Attorney, Agent, or Firm* — Cantor Colburn LLP

(57) ABSTRACT

Provided is an amine group-derivatized composition including a Boc compound for liquid chromatography-mass spectrometry (LC-MS) analysis, and when the amine group-derivatized composition is used in analysis using reverse-phase LC-MS, it is possible to effectively analyze compounds including an amine group and an amino acid at a low cost in a short time.

5 Claims, 5 Drawing Sheets

(56) References Cited

OTHER PUBLICATIONS

Reddy, P. N. et al, Journal of Mass Spectrometry 2005, 40, 1429-1438.*
Sabareesh, V. et al, Rapid Connnnuications in Mass Spectrometry 2006, 20, 1618-628.*
Chankeshwara, S. V. et al, Organic Letters 2006, 8, 3259-3262.*
Varala, R. et al, Journal of Organic Chemistry 2006, 71, 8283-8286.*
Thakur, S. S. et al, Journal of the American Society for Mass Spectrometry 2009, 20, 783-791.*
Frycak, P. et al, Chirality 2009, 21, 929-936.*
Cheraiet, Z. et al, ISRN Organic Chemistry 2012, Article 404235, 8 pages.*
Marik, C. et al, Acta Biologica Szegediensis 2013, 57, 109-112.*
K'tir, H. et al, Chemistry Letters 2014, 43, 851-853.*
Tarbell, D. S. et al, Proceedings of the National Academy of Sciences of the United States of America 1972, 69, 730-732.*
Peter, A. et al, Journal of High Resolution Chromatography 2000, 23, 628-636.*
Sunitha, S. et al, Tetrahedron Letters 2008, 49, 2527-2532.*
Toth, G. K. et al, Chirality 2011, 23, 133-137.*
Bessieres et al., "A convenient, highly selective and eco-friendly N-Boc protection of pyrimidines under microwave irradiation", RSC Advances, 2014, pp. 59747-59749, vol. 4, The Royal Society of Chemistry.
Zhang et al., "Derivatization for the simultaneous LC/MS quantification of multiple neurotransmitters in extracellular fluid from rat brain microdialysis", Journal of Pharmaceutical and Biomedical Analysis, 2014, pp. 357-364, vol. 100, Elsevier B.V.
Korean Office Action for corresponding Korean Patent Application No. 10-2017-0106651 dated Nov. 20, 2018.

* cited by examiner

METHOD OF ANALYZING COMPOUND INCLUDING AMINE GROUP BY USING BOC COMPOUND

CROSS-REFERENCE TO RELATED APPLICATION

This application claims the benefits of Korean Patent Application No. 10-2016-0107775, filed on Aug. 24, 2016 and Korean Patent Application No. 10-2017-0106651, filed on Aug. 23, 2017, in the Korean Intellectual Property Office, the disclosures of which are incorporated herein in their entirety by reference.

BACKGROUND

1. Field

One or more embodiments include a method of analyzing a compound including an amine group using a Boc compound.

2. Description of the Related Art

The most widely used methods for amino acid analysis include a spectroscopic method, gas chromatographic-mass spectrometry (GC-MS), and liquid chromatography-mass spectrometry (LC-MS). When these methods are used, amino acids may be analyzed with excellent sensitivity even with a small amount of a sample. However, when amino acids are analyzed by spectroscopy, there is a drawback in that standard amino acid compounds and coloring compounds must be used. GC-MS must involve derivatization of an amino acid by using a BSTFA or MSTFA reaction compound to analyze the amino acid contained in a sample, and this derivatization reaction is quite difficult to carry out due to the great difference in polarity between the amino acid and the reaction compound. In addition, depending on the amount of moisture in the sample, a yield of the derivatization reaction may vary greatly, which may cause a considerable error in the analysis result of the amino acid. Due to these problems, many studies on amino acid analysis based on LC-MS are under way. Among these methods, when a hydrophilic LC method is used, it is possible to directly isolate an amino acid without derivatization of the amino acid; however, this method is not suitable for separation and analysis of the amino acid, because resolution with regard to an analyte is remarkably poor. Therefore, as of now, research currently being performed is mostly based on reverse-phase chromatography-mass spectrometry. When this method is used, an amino acid may be analyzed with high sensitivity and a small amount thereof. Thus, reverse-phase chromatography-mass spectrometry has been evaluated as the best analytical method to date. However, since amino acids are hydrophilic, chemical derivatization is indispensable for separation performed via reverse-phase chromatography. In addition, a commercial kit for the derivatization of amino acids is highly expensive, and the derivatization reaction time is relatively long; consequently, there is a need to develop a new method of amino acid analysis.

SUMMARY

One or more embodiments include a method of forming a derivative of a compound including an amine group in a sample using a Boc compound and analyzing the derivative by using liquid chromatography-mass spectrometry (LC-MS).

One or more embodiments include an amine-derivatized composition including a Boc compound for LC-MS analysis.

Additional aspects will be set forth in part in the description which follows and, in part, will be apparent from the description, or may be learned by practice of the presented embodiments.

As used herein, the term "and/or" includes any and all combinations of one or more of the associated listed items.

According to one or more embodiments, a method of analyzing a compound including an amine group in a sample includes contacting a compound (Boc compound) including a tert-butyloxycarbonyl group with a sample; producing a Boc-amine derivative by coupling the compound including an amine group in a sample with the Boc compound; and analyzing the Boc-amine derivative by using liquid chromatography-mass spectrometry (LC-MS).

The Boc compound may be a compound represented by Formula 1.

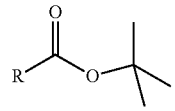

Formula 1

In Formula 1, R may be selected from hydrogen, deuterium, halogen, a nitro group, a cyano group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_3$-$C_{20}$ cycloalkyl group, a substituted or unsubstituted $C_2$-$C_{20}$ heterocycloalkyl group, a substituted or unsubstituted $C_3$-$C_{20}$ cycloalkenyl group, a substituted or unsubstituted $C_2$-$C_{20}$ heterocycloalkenyl group, a substituted or unsubstituted $C_8$-$C_{20}$ cycloalkynyl group, a substituted or unsubstituted $C_2$-$C_{20}$ heterocycloalkynyl group, a substituted or unsubstituted $C_6$-$C_{20}$ aryl group, a substituted or unsubstituted $C_6$-$C_{20}$ aryloxy group, a substituted or unsubstituted $C_6$-$C_{20}$ arylthio group, and a substituted or unsubstituted $C_1$-$C_{20}$ heteroaryl group.

The term "substituted", as used in relation to Formula 1, refers to substitution with a halogen atom, a $C_1$-$C_{20}$ alkyl group substituted with a halogen atom (for example, $CCF_3$, $CHCF_2$, $CH_2F$, $CCl_3$, or the like), a hydroxy group, a nitro group, a cyano group, an amino group, an amidino group, a hydrazine, a hydrazone, a carboxyl group or a salt thereof, a sulfonic acid group or a salt thereof, a phosphoric acid group or a salt thereof, a $C_1$-$C_{20}$ alkyl group, a $C_2$-$C_{20}$ alkenyl group, a $C_2$-$C_{20}$ alkynyl group, a $C_3$-$C_{20}$ cycloalkyl group, a $C_6$-$C_{20}$ aryl group, a $C_6$-$C_{20}$ heteroaryl group, a $C_6$-$C_{20}$ aryl alkyl group, or a $C_6$-$C_{20}$ heteroaryl alkyl group.

The term "$C_1$-$C_{20}$ alkyl group", as used herein, refers to a completely saturated, branched or unbranched (or straight or linear), hydrocarbon group, which contains 1 to 20 carbon atoms. Examples thereof include a methyl group, an ethyl group, a propyl group, an isobutyl group, a sec-butyl group, a ter-butyl group, a neo-butyl group, and the like. At least one hydrogen atom in the alkyl group may be substituted with any substituent described above in relation to the term "substituted".

The term "$C_2$ to $C_{20}$ alkenyl group", as used herein, refers to a straight or branched monovalent unsaturated hydrocarbon group, which contains 2 to 20 carbon atoms and at least one carbon-carbon double bond. Detailed examples thereof include an ethenyl group, an n-propenyl group, an isopropenyl group, an n-but-2-enyl group, a cyclohexenyl group, and an n-hex-3-enyl group. The $C_2$ to $C_{20}$ alkenyl group may include cis and trans isomers or a mixture of thereof. At least one hydrogen atom in the alkenyl group may be substituted with any substituent described above in relation to the term "substituted".

The term "$C_2$ to $C_{20}$ alkynyl group", as used herein, refers to a straight or branched monovalent unsaturated hydrocarbon group, which contains 2 to 20 carbon atoms and at least one carbon-carbon triple bond. Detailed examples thereof include an ethynyl group, an n-propynyl group, an n-but-2-ynyl group, and an n-hex-3-ynyl group. At least one hydrogen atom in the alkynyl group may be substituted with any substituent described above in relation to the term "substituted".

The term "$C_1$ to $C_{20}$ alkoxy group", as used herein, refers to an alkyl group having an oxygen atom bound thereto and containing 2 to 20 carbon atoms. Detailed examples thereof include a methoxy group, an ethoxy group, and a propoxy group. At least one hydrogen atom in the alkoxy group may be substituted with any substituent described above in relation to the term "substituted".

The terms "$C_3$ to $C_{20}$ cycloalkyl group, $C_3$ to $C_{20}$ cycloalkenyl group, and $C_8$ to $C_{20}$ cycloalkynyl group", as used herein, each refer to a non-aromatic carbocyclic group containing a cyclic alkyl group, a cyclic alkenyl group, and a cyclic alkynyl group, respectively, which contains 2 to 20 carbon atoms. The cycloalkyl group, cycloalkenyl group, and the cycloalkynyl group may each include a single ring or multiple rings. The multiple rings may include, e.g., rings having two, three, or four fused rings. Detailed examples of the cycloalkyl group include a cyclopropyl group, a cyclobutyl group, a cyclopentyl group, a cyclohexyl group, a cycloheptyl group, a cyclohexadienyl group, a cycloheptatrienyl group, a norbornyl group, a norcarnyl group, and an adamantyl group. At least one hydrogen atom in the cycloalkyl group, cycloalkenyl group, and cycloalkynyl group may be substituted with any substituent described above in relation to the term "substituted".

The term "$C_2$ to $C_{20}$ heterocycloalkyl group, heterocycloalkenyl group, and heterocycloalkynyl group" each refer to a non-aromatic heterocyclic ring containing 2 to 20 carbon atoms, at least one heteroatom selected from N, O, and S, and a cyclic alkyl group, a cyclic alkenyl group, and a cyclic alkynyl group, respectively. The heterocycloalkyl group may include a single ring or multiple rings, for example, two, three, or four fused rings. Detailed examples of the heterocycloalkyl group include morpholinyl, thiomorpholinyl, piperazinyl, tetrahydrofuranyl, tetrahydrothienyl, 2,3-dihydrobenzofuryl, 1,3-benzodioxole, benzo-1,4-dioxane, piperidinyl, pyrrolidinyl, isooxazolidinyl, isothiazolidinyl, pyrazolidinyl, oxazolidinyl, and thiazolidinyl. At least one hydrogen atom in the heterocycloalkyl group and heterocycloalkenyl group may be substituted with any substituent described above in relation to the term "substituted".

The term "$C_6$-$C_{20}$ aryl group" refers to an aromatic hydrocarbon group containing 6 to 20 carbon atoms and a single ring or multiple rings. The multiple rings may include rings having fused rings (e.g., naphthalene), and/or non-fused rings (e.g., biphenyl). The multiple rings may include, e.g., rings having two, three, or four rings. Unless otherwise defined, the aryl group may generally include 5 to 10, 6 to 15, 6 to 12, or 6 to 10 carbon atoms. Examples of the aryl group include phenyl, naphthalenyl (e.g., naphthalen-1-yl and naphthalen-2-yl), biphenyl, anthracenyl, and phenanthrenyl. At least one hydrogen atom in the aryl group may be substituted with any substituent described above in relation to the term "substituted".

The term "$C_6$ to $C_{20}$ aryloxy group", as used herein, refers to an aryl group having an oxygen atom bound thereto and containing 6 to 20 carbon atoms. Detailed examples thereof include a phenoxy group. At least one hydrogen atom in the aryloxy group may be substituted with any substituent described above in relation to the term "substituted".

The term "$C_6$ to $C_{20}$ arylthio group", as used herein, refers to an aryl group having a sulfur atom bound thereto and containing 6 to 20 carbon atoms. Detailed examples thereof include a phenoxy group. At least one hydrogen atom in the aryloxy group may be substituted with any substituent described above in relation to the term "substituted".

The term "$C_{1-20}$ heteroaryl group", as used herein, refers to a monovalent aromatic group having at least one heteroatom as a ring component. The heteroaryl may include a single ring or multiple rings. The multiple rings may include, e.g., rings having two, three, or four condensed rings. Unless otherwise defined, the heteroaryl group may generally include 3 to 10, 3 to 7, or 3 to 5 cyclic atoms. The heteroaryl group may generally include one, two, or three heteroatoms. Examples of the heteroaryl group may include pyridyl, N-oxopyridyl, pyrimidinyl, pyrazinyl, pyridazinyl, triazinyl, furyl, quinolyl, isoquinolyl, thienyl, imidazolyl, furanyl, thiazolyl, indolyl, pyrrolyl, oxazolyl, benzofuryl, benzothienyl, benzthiazolyl, isoxazolyl, pyrazolyl, triazolyl, tetrazolyl, indazolyl, 1,2,4-thiadiazolyl, isothiazolyl, benzothienyl, purinyl, benzimidazolyl, and indolynyl. At least one hydrogen atom in the heteroaryl group may be substituted with any substituent described above in relation to the term "substituted".

The Boc compound may include any commercially available Boc compound.

The Boc compound may be di-tert-butyl dicarbonate represented by Formula 2:

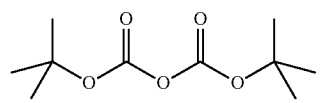

Formula 2

The Boc compound may include any one selected from tert-butyl bromoacetate, tert-butyl chloroacetate, and tert-butyl 3-bromopropionate.

The sample may be one derived from an animal, a plant, or a microorganism, or an artificially synthesized compound. The sample may include a compound containing an amine group. The compound containing an amine group may include a protein, a peptide, or an amino acid.

The Boc compound may selectively produce a derivative compound of any compound containing a primary or secondary amine group. Therefore, when the Boc compound is used, it is possible to selectively analyze compounds containing an amine group without affecting compounds not containing amines, such as secondary metabolomes. In addition, irrespective of whether an amino acid is an L-amino acid or D-amino acid, it is possible to analyze a protein, a peptide, or an amino acid contained in a sample with high efficiency.

The method may further include irradiation with microwaves to produce a Boc-amine derivative. The microwaves may include electromagnetic waves in a frequency range of about 300 megahertz (MHz, 100 centimeters (cm) of wavelength) to about 300 gigahertz (GHz, 0.1 cm of wavelength). The microwaves may include electromagnetic waves having a frequency of about 915 MHz or about 2,450 MHz. The microwave irradiation may be performed, in the producing of a Boc-amine derivative, for about 5 seconds or less, about 10 seconds or less, about 20 seconds or less, about 30 seconds or less, about 1 minute or less, about 5 minutes or less, about 20 minutes or less, or about 30 minutes or less. In some embodiments, the microwave irradiation may be performed for about 5 seconds to about 30 minutes, about 10 seconds to about 20 minutes, about 20 seconds to about 5 minutes, about 30 seconds to about 2 minutes, or about 1 minute. In the producing of a Boc-amine derivative, the microwave irradiation may be performed together with irradiation of electromagnetic waves having a wavelength in a range of about 12.2 cm to about 30 meters (m).

In an embodiment, even without microwave irradiation, it was found that a Boc-amine derivative was produced within about 30 minutes at room temperature or within about 10 minutes at a temperature of about 65° C. Therefore, the producing of a Boc-amine derivative may be performed at room temperature or less, or may be performed at a temperature in a range of about 40° C. to about 80° C., about 45° C. to about 75° C., or about 50° C. to about 70° C., or at a temperature of about 65° C. The produced Boc-amine derivative may be analyzed by using liquid chromatography-mass spectrometry (LC-MS). The liquid chromatography may be performed by using a method that is widely known in the art, such as reverse-phase chromatography, normal-phase chromatography, displacement chromatography, size-exclusion chromatography, ion-exchange chromatography, partition chromatography, or high-performance liquid chromatography. A material separated by the liquid chromatography may then be analyzed by using mass spectrometry, and thus may be analyzed by using LC-MS. This analysis may be performed by using techniques known in the art and commercially available apparatuses.

In an embodiment, it was found that neutral loss commonly occurred specifically upon fragmentation of Boc-amine derivatized compounds by MS. Fragment ions, generated specifically upon neutral loss, may be produced, which may then be used in analyzing all compounds including an amine group that are present in a sample.

FIG. 1 is a schematic view of an embodiment of a derivatization method of an amino acid and reverse-phase LC-MS using a Boc compound. Referring to FIG. 1, when a Boc reagent and an amino acid in a sample are irradiated with microwaves for about 1 minute, a Boc-amino acid derivative may be produced. The Boc-amino acid derivative may then fragment into fragment ions and be analyzed by using a mass spectrometer, and according to ion patterns and distinct neutral loss, when using electrospray ionization (ESI) in positive ion mode, a loss of 100 Daltons of a molecular weight of $C_4H_8$ and $CO_2$ may occur, and when using ESI in negative ion mode, a loss of 74 Daltons of a molecular weight of $C_4H_8$ and $H_2O$ may occur. Detection of compounds including amines in a sample may be performed easily.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
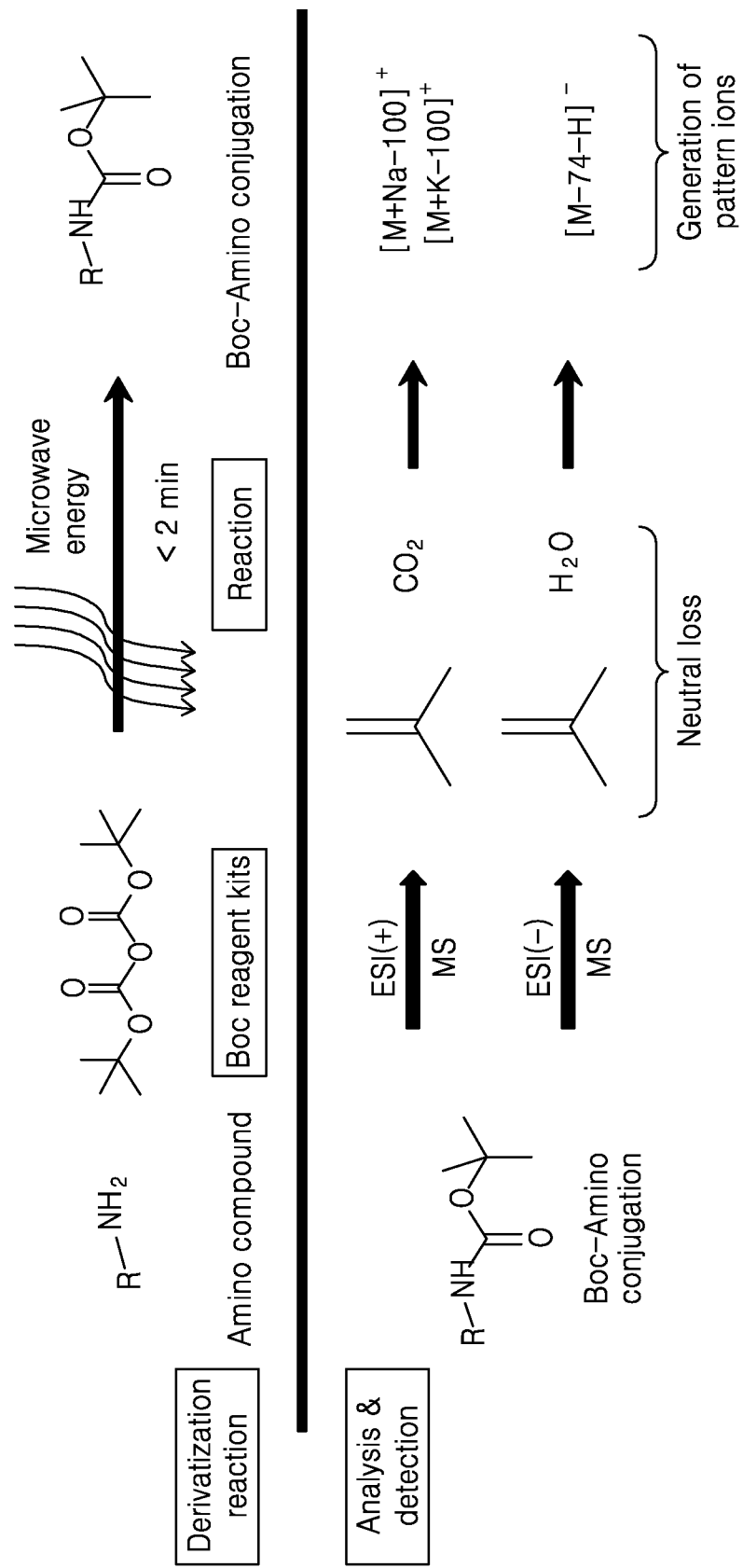
FIG. 1 is a schematic view of an embodiment of amino acid derivatization and reverse-phase liquid chromatography-mass spectrometry (LC-MS) using a Boc compound.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The present disclosure will be described in further detail with reference to the following examples. However, these Examples are for illustrative purposes only, and the scope of the present disclosure is not intended to be limited by these Examples.

Example 1. Method of Analyzing Boc-Amino Acid Derivative Compound Using Reverse-Phase Liquid Chromatography-Mass Spectrometery (LC-MS)

1.1. Fragment Ion Analysis of Boc-Amino Acid Derivative Compound (Example of Phenylalanine-Boc Compound)

In a container, 20 microliters (µL) of a pure solution of 1.0 micromolar (µM) phenylalanine (having a molecular weight of 165) was reacted with a Boc-derivatized composition solution (1 µL of 0.1 millimolar (mM) Boc in MeOH+2 µL of 1 molar (M) NaOH+177 µL of 50% aqueous MeOH). Then, the container was sealed using a silicon cap, and then the reaction mixture was reacted for 1 minute under microwave irradiation.

Figure 2:
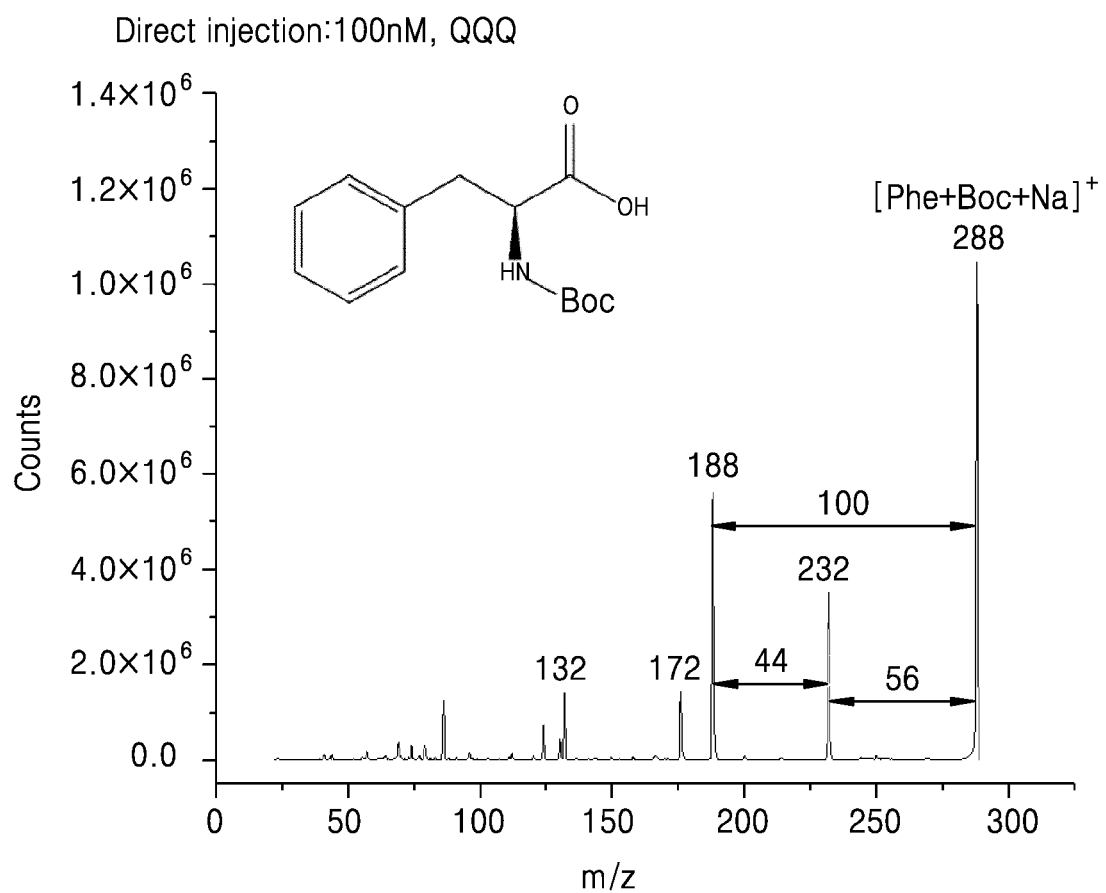
FIG. 2 shows a representative fragmented ionization pattern of Boc-phenylalanine derivative analyzed by a tandem mass spectrometer using electrospray ionization (ESI) in positive ion mode. The distinct neutral loss (100 Da) is observed in all other Boc-amino acid derivatives.
Figure 3:
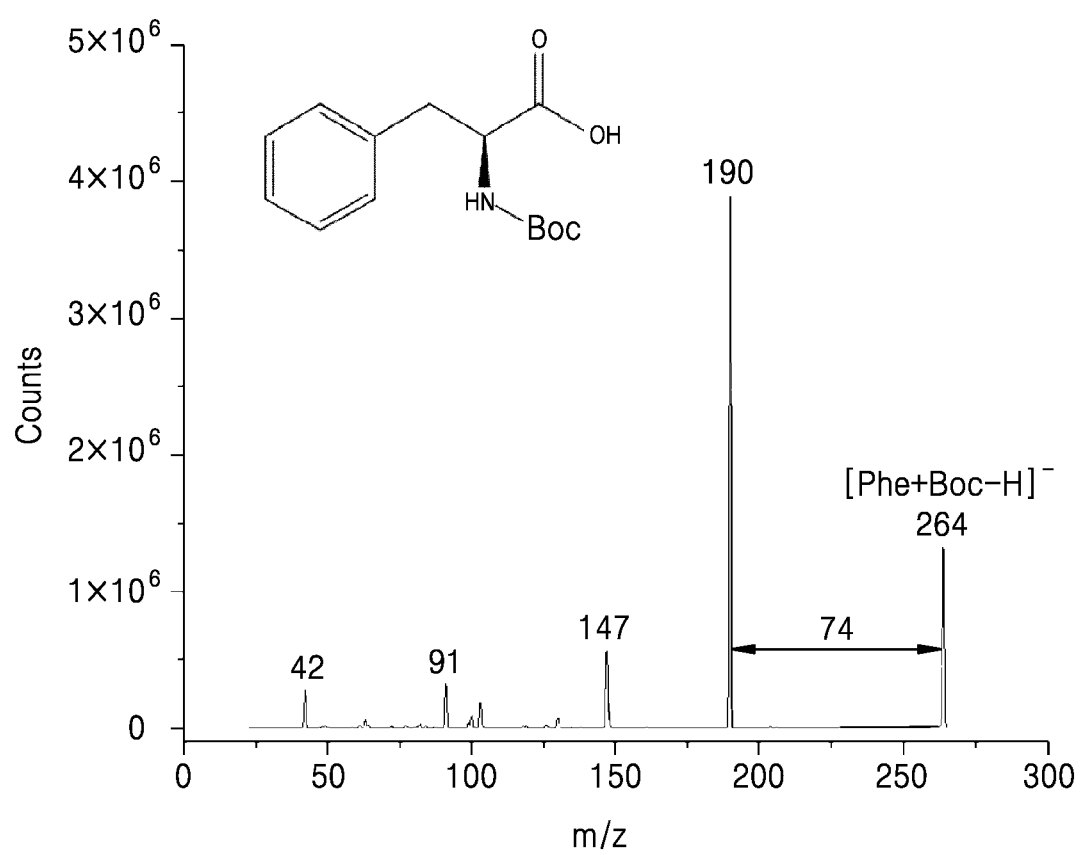
FIG. 3 shows a representative fragmented ionization pattern of Boc-phenylalanine derivative analyzed by a tandem mass spectrometer using ESI in negative ion mode. The distinct neutral loss (74 Da) is observed in all other Boc-amino acid derivatives.

Next, the derivatized solution was ionized by using a triple quadrupole mass spectrometer (API 4000 QTRAP, available from AB SCIEX) using electrospray ionization (ESI) in positive ion mode, thereby obtaining an ion mass of mass-to-charge ratio (m/z) 288. This detected molecular ion corresponds to a molecular ion of phenylalanine (165)+Boc (100)+Na (23). The molecular ion of m/z 288 collided in the tandem mass spectrometer with an energy of 15 electronvolts (eV), thus being fragmented. FIG. 2 is a mass spectrum showing ions of m/z 232 and m/z 188 produced by a loss of molecular weights of 56 and 44 with respect to the molecular ion of m/z 288. FIG. 3 shows the measurement results of the fragmentation pattern of the phenylalanine-Boc compound solution, which was prepared in substantially the same manner as above, obtained by using a tandem mass spectrometer using ESI in negative ion mode. Here, the detected molecular ion of m/z 264 corresponds to a molecular ion of phenylalanine (165)+Boc (100)−H (1). The molecular ion of m/z 264 collided in the tandem mass spectrometer with an energy of 16 eV, thus being fragmented. The fragment ionization mass spectrum of FIG. 3 shows ions of m/z 186 produced by a loss of a molecular weight of 74 with respect to the molecular ion of m/z 264. This example shows fragment ions generated by the neutral loss of an amino acid, that is, phenylalanine. In addition to phenylalanine, upon ionization of all standard amino acid compounds, [M+Boc+Na]$^+$ ions were obtained in the above reaction.

1.2. Analysis of Boc-Amino Acid Derivative Compound (Example of Mixture of 21 Amino Acids)

In order to verify whether, in addition to phenylalanine, mass spectrometry is applicable to all other kinds of amino acids using a Boc compound, 10 μL of the resulting product of 21 amino acids derivatized with a Boc compound (in which the final concentration of each amino acid was 0.1 μM) was injected using an automatic sample injector, and then separated through a reverse-phase high-performance liquid chromatography (HPLC) column (available from Waters, UPLC C18, Acquity, 2.1×100 mm, 1.7 micrometers (μm)). Here, as a mobile phase solvent, each of A: water-soluble 95% water (95:5 v/v, H$_2$O:ACN) and B: 95% ACN (95:5 v/v, ACN:H$_2$O) were used. The concentration gradient conditions are as follows.

TABLE 1

HPLC solvent concentration gradient conditions

| Time (minutes) | A % (95:5 v/v, H$_2$O:ACN) | B % (95:5 v/v, ACN:H$_2$O) | Velocity of flow (mL/min) |
|---|---|---|---|
| 0 | 95 | 5 | 600 |
| 10 | 0 | 100 | 600 |
| 10.1 | 95 | 5 | 600 |
| 12 | 95 | 5 | 600 |

Next, API 4000 QTRAP available from AB SCIEX was used as a Tandem QQQ mass spectrometer for ionization using ESI in negative ion mode, followed by measurement. The multiple reaction monitoring (MRM) conditions for each amino acid are as follows.

TABLE 2

Amino acid MRM conditions of Tandem QQQ mass spectrometry

| No. | ID | RT (min) | Q1 | Q3 | DP | EP | CE | CXP |
|---|---|---|---|---|---|---|---|---|
| 1 | Arginine | 1.46 | 273 | 199 | −35 | −10 | −16 | −7 |
| 2 | Asparagine | 1.62 | 231 | 157 | −50 | −10 | −12 | −9 |
| 3 | Glutamine | 1.72 | 245 | 171 | −35 | −10 | −12 | −1 |
| 4 | Serine | 1.87 | 204 | 130 | −25 | −10 | −12 | −9 |
| 5 | Aspartic acid | 2.12 | 232 | 158 | −35 | −10 | −16 | −11 |
| 6 | Glycine | 2.16 | 174 | 100 | −35 | −10 | −12 | −5 |
| 7 | Glutamic acid | 2.26 | 246 | 172 | −30 | −10 | −14 | −7 |
| 8 | Threonine | 2.38 | 218 | 144 | −30 | −10 | −12 | −9 |
| 9 | Alanine | 2.63 | 188 | 114 | −45 | −10 | −12 | −7 |
| 10 | GABA | 2.86 | 251 | 177 | −45 | −10 | −10 | −5 |
| 11 | Proline | 3.19 | 214 | 140 | −70 | −10 | −20 | −7 |
| 12 | Cysteine | 3.21 | 220 | 146 | −25 | −10 | −10 | −9 |
| 13 | Tyrosine | 3.41 | 280 | 206 | −50 | −10 | −12 | −29 |
| 14 | Methionine d3 | 3.83 | 251 | 177 | −50 | −10 | −12 | −29 |
| 15 | Methionine | 3.89 | 248 | 174 | −70 | −10 | −12 | −7 |
| 16 | Phenylalanine | 3.92 | 264 | 190 | −35 | −10 | −12 | −7 |
| 17 | Valine | 3.92 | 216 | 142 | −30 | −10 | −12 | −1 |
| 18 | Histidine | 4.4 | 354 | 280 | −55 | −10 | −14 | −11 |
| 19 | Isoleucine | 4.53 | 230 | 126 | −50 | −10 | −14 | −11 |
| 20 | Leucine | 4.62 | 230 | 156 | −25 | −10 | −12 | −9 |
| 21 | Tryptophan | 4.7 | 303 | 229 | −50 | −10 | −14 | −11 |
| 22 | Lysine | 4.88 | 345 | 271 | −60 | −10 | −16 | −29 |

Figure 4:
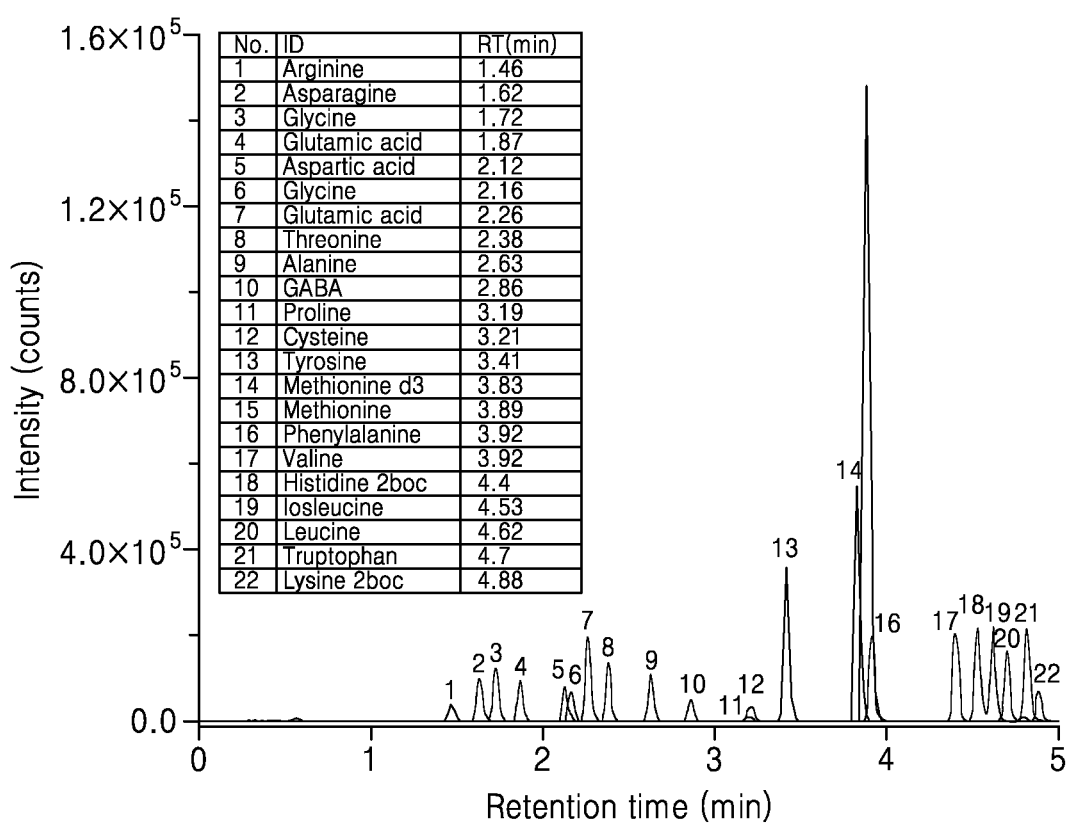
FIG. 4 is a chromatogram of standard amino acids derivatized using a Boc compound and analyzed by a multiple reaction monitoring (MRM) method.

As a result, all 21 kinds of amino acids included in a bean sample were detected, as shown in FIG. 4. Each signal is marked by a number which represents the corresponding amino acid.

Example 2. Test of Boc-Amine Compound Signal Intensity Versus Boc-Amine Derivatization Reaction Time Table 3 shows the signal intensity of derivatives detected by the Tandem QQQ mass spectrometer versus the derivatization reaction time of the prepared Boc-amine compound. Referring to Table 3, the reaction time for the Boc-amine derivatization reaction was determined. The derivatization reaction was performed in substantially the same manner as in Example 1.2.

TABLE 3

The signal intensity of amino acid derivatives versus derivatization reaction time

| Amino acid | Signal intensity (reacted for 10 seconds) | Signal intensity (reacted for 30 seconds) | Signal intensity (reacted for 1 minute) | Signal intensity (reacted for 5 minutes) | Signal intensity (reacted for 30 minutes) |
|---|---|---|---|---|---|
| Histidine | $0.42 \times 10^4$ | $0.82 \times 10^4$ | $2.12 \times 10^4$ | $2.02 \times 10^4$ | $1.83 \times 10^4$ |
| Serine | $0.22 \times 10^4$ | $0.56 \times 10^4$ | $1.32 \times 10^4$ | $1.10 \times 10^4$ | $1.03 \times 10^4$ |
| Valine | $0.32 \times 10^4$ | $0.81 \times 10^4$ | $2.08 \times 10^4$ | $1.86 \times 10^4$ | $1.61 \times 10^4$ |
| Isoleucine | $0.49 \times 10^4$ | $0.79 \times 10^4$ | $2.19 \times 10^4$ | $2.07 \times 10^4$ | $1.81 \times 10^4$ |

Example 3. Comparison of Derivatization Reaction for Detecting Amine Compound 3.1 Preparation of Rice Extract The Boc compound may selectively produce a derivative compound for any compound containing a primary or secondary amine group. At the same time, use of the Boc compound is advantageous in that the Boc compound may not affect detection of secondary metabolome not including an amine group, while providing information on the whole metabolome. In order to verify this advantage, amine compound detectivity of a dansylation derivatization reaction, which is generally used in detection of an amine compound, and that of a Boc-amine derivatization reaction were compared and analyzed. The comparative analysis was carried out as follows. First, 0.04 grams (g) of a seed was ground into powder, which was then sonicated for 1 hour using 4 milliliters (mL) of 50% water-soluble methanol (50/50, v/v, water/methanol). The resultant was then filtrated by using a 0.2 μm filter. The extracted sample was dried, and then re-solubilized using a dimethyl sulfoxide (DMSO) solvent at a concentration of 30 mg/mL, thereby preparing a rice extract sample.

3.2 Boc Derivatization

Aside from the above process, a Boc compound was dissolved in 100% methanol to prepare a 1.0 M solution. Next, 20 μL of the rice extract sample, 4 μL of reaction solutions for Boc derivatization, 4 μL of NaOH (1 M) Boc compound, and 72 μL of 50% aqueous MeOH were added to a glass vial, which was then sealed with a silicon cap. Then, the mixture was reacted under microwave irradiation for 1 minute. Accordingly, a Boc-amine derivatization product of the rice extract was obtained.

3.3 Dansylation Derivatization

For comparative evaluation, a rice extract sample (30 mg/mL) and a reaction solution generally used in a dansylation derivatization reaction were prepared as follows to carry out the derivatization reaction. First, 40 μL of a buffer solution (1.0M NaHCO$_3$/Na$_2$CO$_3$) and 5 μL of dansylchloride (1.0 M in an ACN solution) were mixed together with 20 μL of a rice extract sample and 40 μL of 50% aqueous MeOH in a glass vial. The reaction was carried out at a temperature of 60° C. for 60 minutes. Afterwards, the reaction solution was cooled to room temperature. 5 μL of a NaOH solution (0.25M) was added to the reaction solution, which was then reacted for 10 minutes. 10 μL of formic acid (0.425M) was added thereto to complete the reaction.

3.4 Analysis of Amine-Derivatized Compound

By using HPLC, derivative compounds including each amine group included in rice were separated according to time, and then ionized by ESI in positive ion mode.

10 μL of the finally completed derivatization solution was separated using HPLC, and components thereof were ionized by ESI in positive ion mode. Here, the column and the solvent concentration gradient conditions were the same as those of Example 2.2. Next, a Q-TOF mass spectrometer (microTOF II, available from Bruker) was used to measure the mass of each amino acid derivative compound using ESI in positive ion mode (in a range of 50 m/z to 800 m/z). Here, the ionization conditions were as follows: capillary voltage of 4,500 Volts (V), nebulizer gas of 0.8 bar, dry gas of 8 L/min, and dry temperature of 180° C.

Figure 5A:
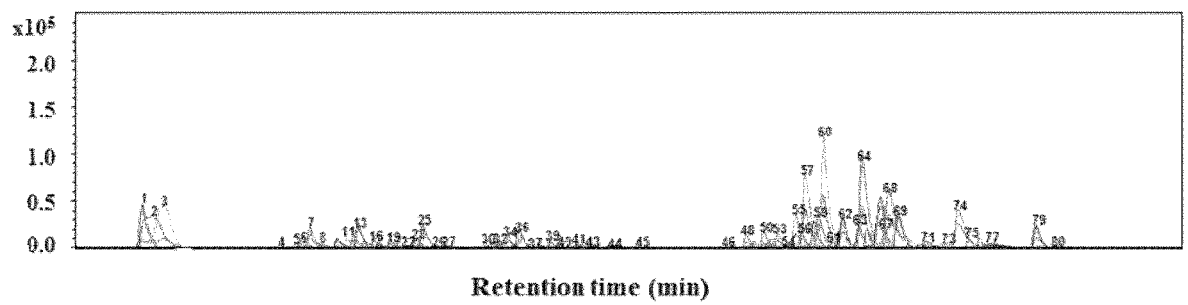
FIG. 5A is an analytical chromatogram of metabolome components included in a rice extract before performing amine derivatization thereof.
Figure 5B:
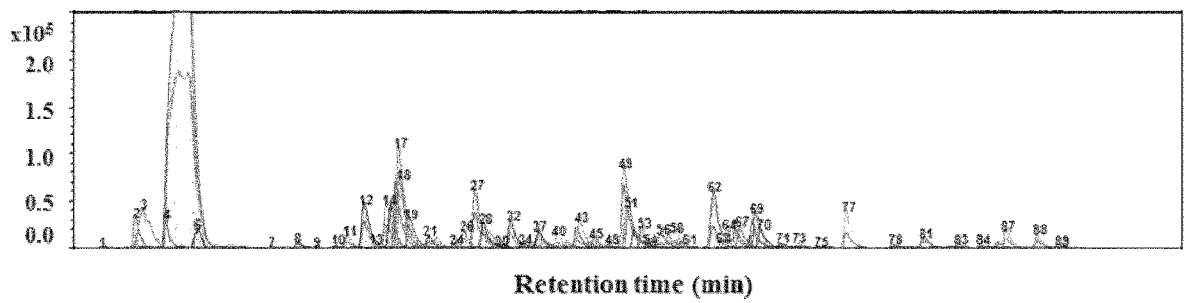
FIG. 5B is an analytical chromatogram of metabolome components included in a rice extract after performing dansylation thereof.
Figure 5C:
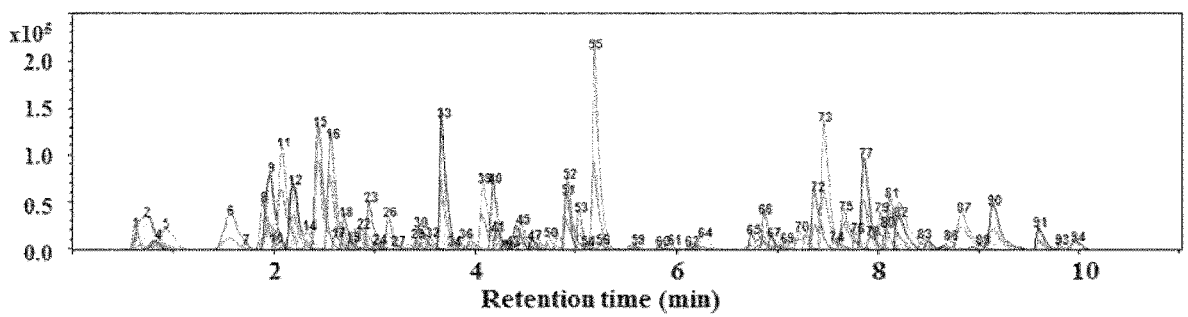
FIG. 5C is an analytical chromatogram of metabolome components included in a rice extract after performing Boc derivatization thereof.

FIG. 5A is a chromatogram of components included in a rice extract, of which a derivatization reaction for amine compounds has not been performed, as analyzed by LC-MS. FIG. 5B is a chromatogram of components included in a rice extract after performing dansylation of amine compounds. FIG. 5C is a chromatogram of components included in a rice extract after performing a Boc-amine derivatization reaction for amine compounds. Referring to FIG. 5B, in the retention time ranging from 1 minute to 8 minutes after performing the dansylation, signals can be seen which did not appear in FIG. 5A. It was found that these signals were caused by amine compounds due to amine derivatization. However, it was found that most of the secondary metabolome components of the rice extract that appeared in the retention time ranging from 6 minutes to 10 minutes disappeared after performing the dansylation. Referring to FIG. 5C, after performing the Boc-amine derivatization, it was found that new amine compounds appeared, and furthermore, the secondary metabolome components of the rice extract also were detected without being affected by the Boc reaction. Accordingly, it was found that the Boc-amine derivatization reaction is effective in derivatization of components including amine compounds, and furthermore, it was found that the Boc-amine derivatization reaction barely affects dissociation of the secondary metabolome not including amine compounds. In metabolomic analysis, upon analysis of hundreds or more samples according to the current analysis processing capability, amine compounds should be analyzed again separately; however, these results provide a significant improvement in this regard.

As described above, according to one or more embodiments, when LC-MS using a Boc compound is used as a method of analysis, it is possible to analyze a compound including an amine group at a low cost in a short time.

When an amine group-derivatized composition including a Boc compound is used for LC-MS analysis, it is possible to analyze a compound including an amine group at a low cost in a short time.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of analyzing a compound comprising an amine group in a sample, the method comprising:
    contacting a compound represented by Formula 1 with a sample;
    producing a Boc-amine derivative by coupling the compound comprising an amine group in a sample with the compound represented by Formula 1; and
    analyzing the Boc-amine derivative by using liquid chromatography-mass spectrometry (LC-MS),

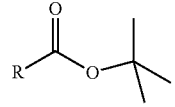

Formula 1 wherein, in Formula 1, R is selected from hydrogen, deuterium, halogen, a nitro group, a cyano group, a substituted or unsubstituted C$_1$-C$_{20}$ alkyl group, a substituted or unsubstituted C$_2$-C$_{20}$ alkenyl group, a substituted or unsubstituted C$_2$-C$_{20}$ alkynyl group, a substituted or unsubstituted C$_1$-C$_{20}$ alkoxy group, a substituted or unsubstituted C$_3$-C$_{20}$ cycloalkyl group, a substituted or unsubstituted C$_2$-C$_{20}$ heterocycloalkyl group, a substituted or unsubstituted C$_3$-C$_{20}$ cycloalkenyl group, a substituted or unsubstituted $C_2$-$C_{20}$ heterocycloalkenyl group, a substituted or unsubstituted $C_8$-$C_{20}$ cycloalkynyl group, a substituted or unsubstituted $C_2$-$C_{20}$ heterocycloalkynyl group, a substituted or unsubstituted $C_6$-$C_{20}$ aryl group, a substituted or unsubstituted $C_6$-$C_{20}$ aryloxy group, a substituted or unsubstituted $C_6$-$C_{20}$ arylthio group, and a substituted or unsubstituted $C_1$-$C_{20}$ heteroaryl group.

2. The method of claim 1, wherein the producing of a Boc-amine derivative is performed under microwave irradiation for about 30 seconds to about 2 minutes.

3. The method of claim 1, wherein the compound represented by Formula 1 is di-tert-butyl dicarbonate.

4. The method of claim 1, wherein the compound comprising an amine group is an amino acid.

5. The method of claim 1, wherein the analyzing of the Boc-amine derivative by using LC-MS is performed by detecting neutral loss of the compound comprising an amine group.

* * * * *